US011176433B2

United States Patent
Sayama

(10) Patent No.: US 11,176,433 B2
(45) Date of Patent: Nov. 16, 2021

(54) PIPE CONNECTION DECISION DEVICE THAT DETECTS WRONG PIPE CONNECTION, AND IMAGE FORMING APPARATUS

(71) Applicant: KYOCERA Document Solutions Inc., Osaka (JP)

(72) Inventor: Haruki Sayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/202,832

(22) Filed: Mar. 16, 2021

(65) Prior Publication Data

US 2021/0303951 A1   Sep. 30, 2021

(30) Foreign Application Priority Data

Mar. 24, 2020   (JP) .............................. JP2020-052800

(51) Int. Cl.
    *G06K 15/00* (2006.01)
    *H04N 1/00* (2006.01)
    (Continued)

(52) U.S. Cl.
    CPC ............ *G06K 15/408* (2013.01); *B41J 2/175* (2013.01); *G06K 15/102* (2013.01); *G06K 15/407* (2013.01); *H04N 1/00037* (2013.01); *H04N 1/0049* (2013.01); *H04N 1/00074* (2013.01); *H04N 1/00084* (2013.01);
    (Continued)

(58) Field of Classification Search
    CPC .. G06K 15/408; G06K 15/102; G06K 15/407; B41J 2/175; H04N 1/00037; H04N 1/00074; H04N 1/00084; H04N 1/00352; H04N 1/00408; H04N 1/0049; H04N 1/00557; H04N 2201/0094
    See application file for complete search history.

(56) References Cited

U.S. PATENT DOCUMENTS

2006/0170739 A1*  8/2006  Koga ...................... B41J 2/175
                                                    347/85
2009/0290003 A1* 11/2009  Udagawa ............... B41J 2/1752
                                                    347/86
(Continued)

FOREIGN PATENT DOCUMENTS

JP          2001-199083 A       7/2001

*Primary Examiner* — Moustapha Diaby
(74) *Attorney, Agent, or Firm* — IP Business Solutions, LLC

(57) ABSTRACT

A pipe connection decision device includes a first material including a plurality of first pipes each having a connector receiver attached to one end, a second material including a plurality of second pipes each having a connector attached to one end, a plurality of light emitters respectively provided on the plurality of connector receivers, a plurality of light receivers respectively provided on the plurality of connectors, a storage device, a display device, and a control device. The control device causes the display device, upon deciding that the color of received light accords with an allocated color, with respect to all of the plurality of light receivers, to display a first message, and causes the display device, upon deciding that the color of received light discords with the allocated color, with respect to at least one of the plurality of light receivers, to display a second message.

11 Claims, 18 Drawing Sheets

(51) Int. Cl.
*G06K 15/10* (2006.01)
*B41J 2/175* (2006.01)

(52) U.S. Cl.
CPC ..... *H04N 1/00352* (2013.01); *H04N 1/00408* (2013.01); *H04N 1/00557* (2013.01); *H04N 2201/0094* (2013.01)

(56) References Cited

U.S. PATENT DOCUMENTS

2013/0169720 A1* 7/2013 Nakamura ............... B41J 2/175
 347/86
2014/0320557 A1* 10/2014 Matsumoto .......... B41J 2/17526
 347/5
2017/0197429 A1* 7/2017 Kimura ............... B41J 2/17559

* cited by examiner

Fig.5A

| FLOW PATH | LIGHT EMITTER | EMITTED COLOR | LIGHT RECEIVER | ALLOCATED COLOR |
|---|---|---|---|---|
| Y | T1 | YELLOW (=RED+GREEN) | R1 | YELLOW |
| C | T2 | BLUE | R2 | BLUE |
| M | T3 | RED | R3 | RED |
| Bk | T4 | PURPLE (=RED+BLUE) | R4 | PURPLE |

| FLOW PATH | LIGHT EMITTER ID | EMITTED COLOR | LIGHT RECEIVER ID | ALLOCATED COLOR |
|---|---|---|---|---|
| Y | TX01 | YELLOW (=RED+GREEN) | RX01 | YELLOW |
| C | TX02 | BLUE | RX02 | BLUE |
| M | TX03 | RED | RX03 | RED |
| Bk | TX04 | PURPLE (=RED+BLUE) | RX04 | PURPLE |

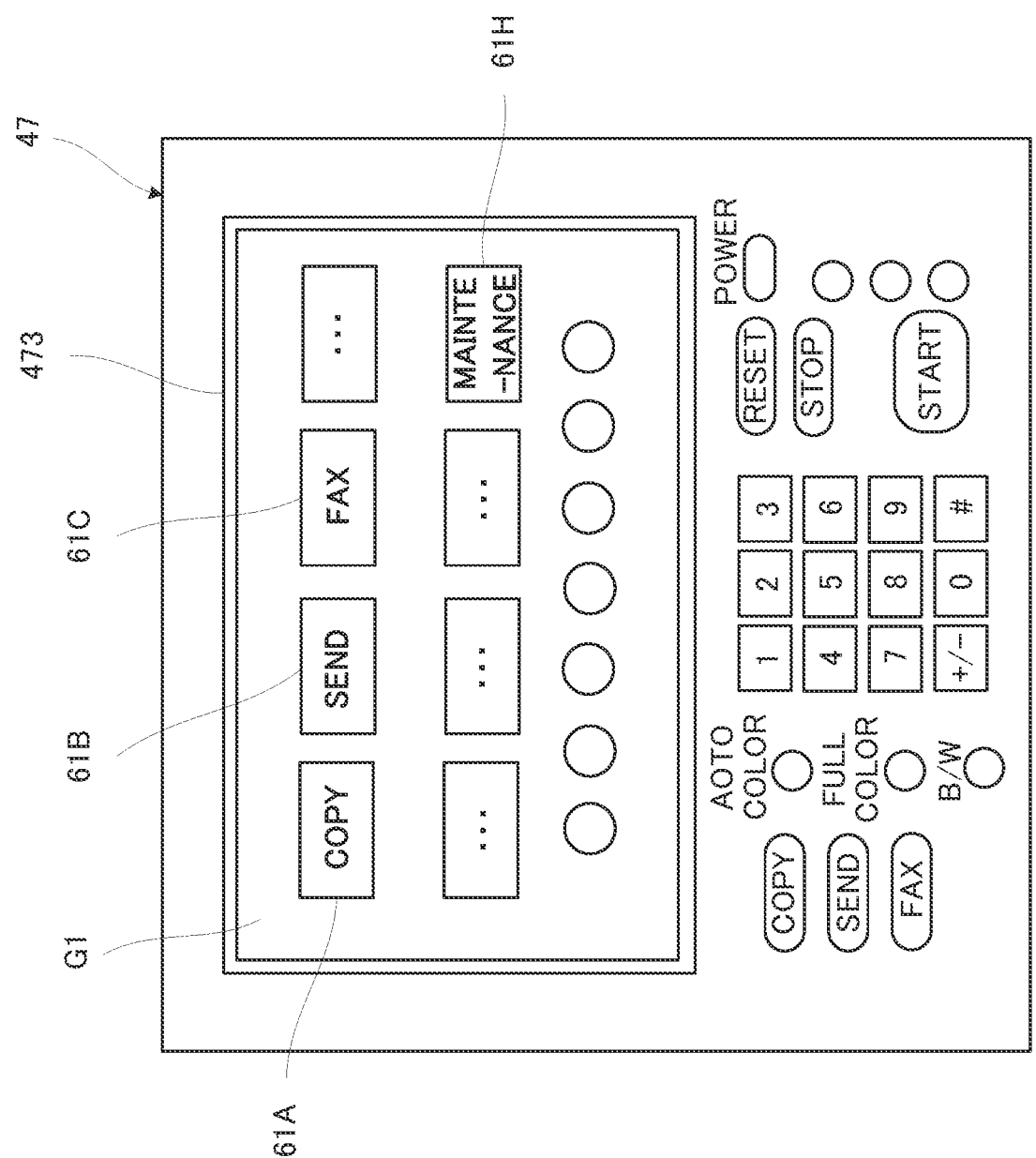

Fig.8A

| LIGHT RECEIVER | ALLOCATED COLOR | LIGHT PATTERN | RECEIVED COLOR | RECEPTION LEVEL | DECISION RESULT |
|---|---|---|---|---|---|
| R1 | YELLOW | RED:ON, GREEN:ON, BLUE:OFF | YELLOW | EXCEEDING THRESHOLD | NORMAL |
| R2 | BLUE | RED:OFF, GREEN:OFF, BLUE:ON | BLUE | EXCEEDING THRESHOLD | NORMAL |
| R3 | RED | RED:ON, GREEN:OFF, BLUE:OFF | RED | EXCEEDING THRESHOLD | NORMAL |
| R4 | PURPLE | RED:ON, GREEN:OFF, BLUE:ON | PURPLE | EXCEEDING THRESHOLD | NORMAL |

TB ⟵ ⟶ RTB

Fig.8C

| LIGHT RECEIVER ID | ALLOCATED COLOR | LIGHT PATTERN | RECEIVED COLOR | RECEPTION LEVEL | DECISION RESULT |
|---|---|---|---|---|---|
| RX01 | YELLOW | RED:ON,GREEN:ON, BLUE:OFF | YELLOW | EXCEEDING THRESHOLD | NORMAL |
| RX02 | BLUE | RED:OFF,GREEN:OFF, BLUE:ON | BLUE | EXCEEDING THRESHOLD | NORMAL |
| RX03 | RED | RED:ON,GREEN:OFF, BLUE:OFF | RED | EXCEEDING THRESHOLD | NORMAL |
| RX04 | PURPLE | RED:ON,GREEN:OFF, BLUE:ON | PURPLE | EXCEEDING THRESHOLD | NORMAL |

TB ― ― ― RTB

Fig.9A

| LIGHT RECEIVER | ALLOCATED COLOR | LIGHT PATTERN | RECEIVED COLOR | RECEPTION LEVEL | DECISION RESULT | WORK TYPE |
|---|---|---|---|---|---|---|
| R1 | YELLOW | RED:ON, GREEN:ON, BLUE:OFF | YELLOW | EXCEEDING THRESHOLD | NORMAL | N/A |
| R2 | BLUE | RED:ON, GREEN:OFF, BLUE:OFF | RED | EXCEEDING THRESHOLD | WRONG | CONNECT TO C |
| R3 | RED | RED:OFF, GREEN:OFF, BLUE:ON | BLUE | EXCEEDING THRESHOLD | WRONG | CONNECT TO M |
| R4 | PURPLE | RED:OFF, GREEN:OFF, BLUE:OFF | — | NOT EXCEEDING THRESHOLD | WRONG | CONNECT MORE SECURELY |

| CHECK RESULT OF CONNECTION TO INK TANK UNIT |
|---|
| WRONG CONNECTION — AM1 |
| TRANSFER CONNECTOR (C) ON CONNECTOR RECEIVER (M) TO CONNECTOR RECEIVER (C) — AM2 |
| TRANSFER CONNECTOR (M) ON CONNECTOR RECEIVER (C) TO CONNECTOR RECEIVER (M) — AM3 |
| FASTEN CONNECTOR (Bk) MORE SECURELY — AM4 |

Fig.9C

| LIGHT RECEIVER ID | ALLOCATED COLOR | LIGHT PATTERN | RECEIVED COLOR | RECEPTION LEVEL | DECISION RESULT | WORK TYPE |
|---|---|---|---|---|---|---|
| RX01 | YELLOW | RED:ON,GREEN:ON, BLUE:OFF | YELLOW | EXCEEDING THRESHOLD | NORMAL | N/A |
| RX02 | BLUE | RED:ON,GREEN:OFF, BLUE:OFF | RED | EXCEEDING THRESHOLD | WRONG | CONNECT TO C |
| RX03 | RED | RED:OFF,GREEN:OFF, BLUE:ON | BLUE | EXCEEDING THRESHOLD | WRONG | CONNECT TO M |
| RX04 | PURPLE | RED:OFF,GREEN:OFF, BLUE:OFF | — | NOT EXCEEDING THRESHOLD | WRONG | CONNECT MORE SECURELY |

TB / RTB

| CHECK RESULT OF CONNECTION TO INK TANK UNIT |
|---|
| CONNECTOR (Y) IS NORMALLY CONNECTED — NM1 |
| WRONG CONNECTION — AM1 |
| TRANSFER CONNECTOR (C) ON CONNECTOR RECEIVER (M) TO CONNECTOR RECEIVER (C) — AM2 |
| TRANSFER CONNECTOR (M) ON CONNECTOR RECEIVER (C) TO CONNECTOR RECEIVER (M) — AM3 |
| FASTEN CONNECTOR (Bk) MORE SECURELY — AM4 |

PIPE CONNECTION DECISION DEVICE THAT DETECTS WRONG PIPE CONNECTION, AND IMAGE FORMING APPARATUS

INCORPORATION BY REFERENCE

This application claims priority to Japanese Patent Application No. 2020-052800 filed on Mar. 24, 2020, the entire contents of which are incorporated by reference herein.

BACKGROUND

The present disclosure relates to a pipe connection decision device and an image forming apparatus, and in particular to a technique to decide whether a pipe is correctly connected.

In image forming apparatuses of a color ink jet system, four color inks, namely yellow, cyan, magenta, and black, are employed. The image forming apparatus includes an ink supply device having ink supply containers of the respective colors and ink supply pumps for feeding the ink from the respective ink supply containers, an ink tank unit having ink storage tanks for temporarily storing the respective color inks supplied from the ink supply device, and an ink jet head that ejects the respective color inks supplied from the ink tank unit, onto a recording sheet.

In the mentioned image forming apparatus of the color ink jet system, the ink flow path including an ink pipe and a joint section has to have the same flow path resistance for all the colors, from the physical viewpoint. From the manufacturing viewpoint, further, the ink pipe and the joint section are required to have the same shape, to minimize the burden on designing and manufacturing that may be imposed when the ink pipes and the joint sections for different colors are given different shapes. Accordingly, the joint sections for different colors having the same shape are collectively located at a predetermined position in the ink tank unit. Where the joint sections for different colors having the same shape are collectively located, the connector at the distal end of the pipe from the ink supply device may fail to be correctly connected to the connector on the side of the ink tank unit. Therefore, some of the existing image forming apparatuses are provided with a detector for detecting whether the connectors are connected, to prevent imperfect connection between the connectors.

SUMMARY

The disclosure proposes further improvement of the foregoing technique. In an aspect, the disclosure provides a pipe connection decision device including a first material, a second material, a plurality of light emitters, a plurality of light receivers, a storage device, a display device, and a control device. The first material includes a plurality of first pipes each having a connector receiver attached to one end, the connector receivers having a same shape and aligned at a predetermined position. The second material includes a plurality of second pipes each having a connector attached to one end, the connectors having a same shape and being configured to be fitted to any of the connector receivers. The plurality of light emitters are respectively provided on the plurality of connector receivers, and each output light of a predetermined color allocated to the corresponding connector receiver, the colors being different from each other. The plurality of light receivers are respectively provided on the plurality of connectors, and each receive, when the connector receiver and the connector are coupled with each other, the light from the light emitter of the connector receiver coupled with the corresponding connector. The storage device contains in advance the allocated color to be received by the light receiver, with respect to each of the plurality of connectors. The control device includes a processor, and acts as an identifier, a decider, and a controller, when the processor executes a control program. The identifier identifies the color of the light received by each of the plurality of light receivers. The decider decides, with respect to each of the plurality of light receivers, whether the color of the light received by the light receiver and identified by the identifier accords with the allocated color stored in the storage device with respect the corresponding light receiver. The controller causes the display device to display a first message indicating that all of the plurality of connectors are normally connected, when the decider decides that the color of received light accords with the allocated color, with respect to all of the plurality of light receivers, and to display, when the decider decides that the color of received light discords with the allocated color, with respect to at least one of the plurality of light receivers, a second message indicating that the connector, having the light receiver with respect to which the decider has decided that the color of received light discords with the allocated color, is wrongly connected.

In another aspect, the disclosure provides an image forming apparatus including the foregoing pipe connection decision device, and an ink jet head. The ink jet head ejects ink of predetermined colors different from each other, onto a recording sheet. The second material includes an ink supply device having a plurality of ink supply containers respectively provided for the predetermined colors, a plurality of ink supply pumps that feed the ink from the respective ink supply containers, and the plurality of second pipes each having the other end connected to one of the plurality of ink supply pumps. The first material includes an ink tank unit having a plurality of ink storage tanks for storing the ink of the respective colors supplied from the ink supply device, and the plurality of first pipes each having the other end connected to one of the plurality of ink storage tanks. The ink tank unit supplies the ink of the predetermined colors delivered from the respective ink storage tanks, to the ink jet head.

BRIEF DESCRIPTION OF THE DRAWINGS

FIG. 5A shows a cross-reference table showing correspondence between a light emitter of each color in the ink tank unit and a light receiver of each color in the ink supply device;

FIG. 5B shows another example of the cross-reference table;

FIG. 7 is a schematic drawing showing an example of an operation device;

FIG. 8A is a schematic drawing showing a decision result indicating normal connection, presented by a decider;

FIG. 8C is a schematic drawing showing another example of the decision result indicating normal connection;

FIG. 9A is a schematic drawing showing a decision result indicating wrong connection, presented by the decider;

FIG. 9B is a schematic drawing showing an example of a screen displaying the decision result indicating wrong connection;

FIG. 9C is a schematic drawing showing another example of the decision result indicating wrong connection;

FIG. 10B is a schematic drawing showing another example of the screen displaying the decision result indicating wrong connection;

DETAILED DESCRIPTION

Figure 1:
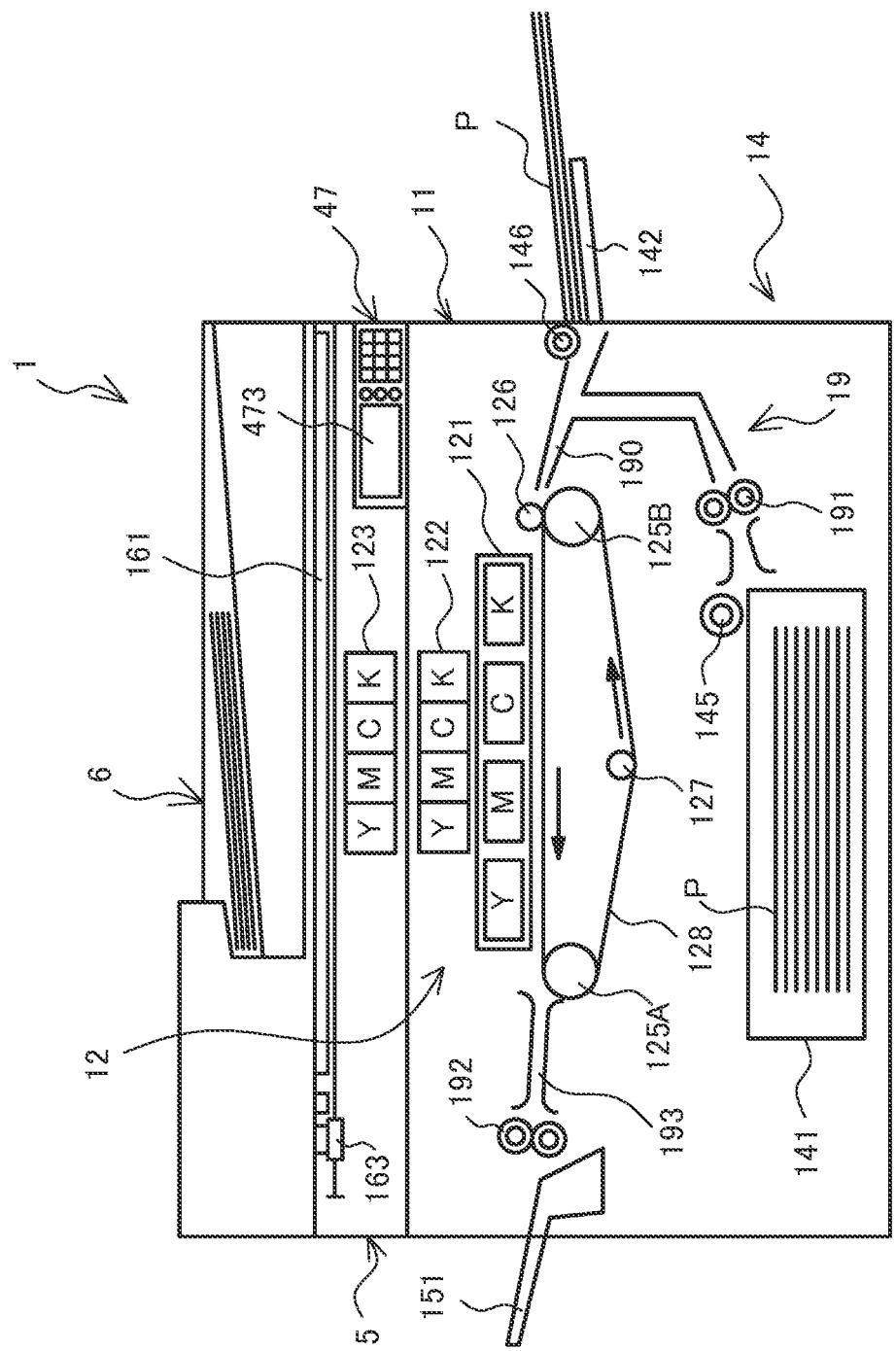
FIG. 1 is a schematic front cross-sectional view showing a configuration of an image forming apparatus, including a pipe connection decision device according to a first embodiment of the disclosure.
Figure 2:
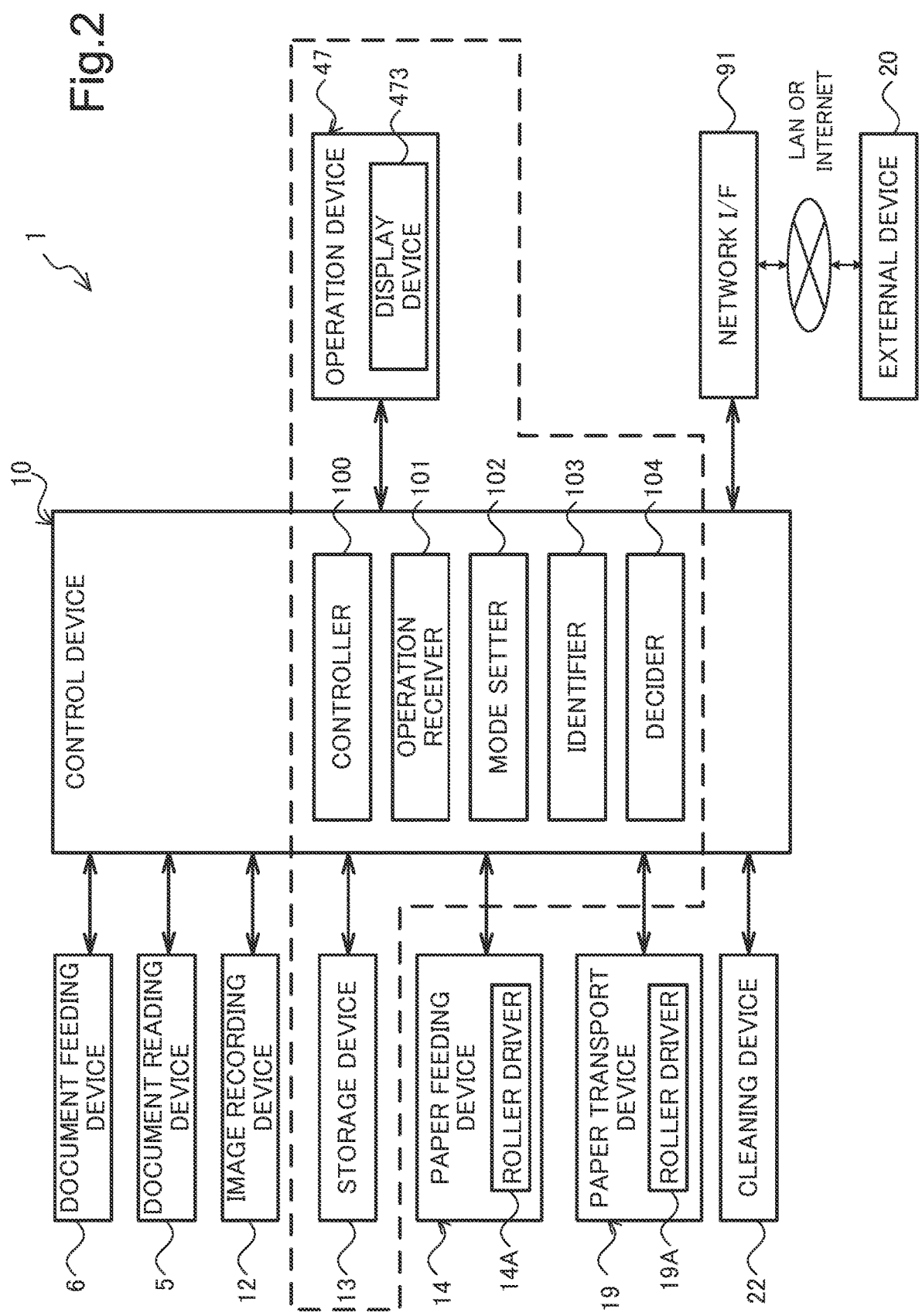
FIG. 2 is a functional block diagram schematically showing an essential internal configuration of the image forming apparatus according to the first embodiment.

Hereafter, a pipe connection decision device 30 and an image forming apparatus 1 according to embodiments of the disclosure will be described, with reference to the drawings. FIG. 1 is a front cross-sectional view showing a configuration of the image forming apparatus, including the pipe connection decision device according to a first embodiment of the disclosure. FIG. 2 is a functional block diagram schematically showing an essential internal configuration of the image forming apparatus according to the first embodiment. The image forming apparatus 1 is a color ink jet printer. More specifically, the image forming apparatus 1 is a multifunction peripheral having a plurality of functions such as copying, printing, scanning, and fax transmission and reception, and includes an operation device 47, a document feeding device 6, a document reading device 5, an image recording device 12, a storage device 13, a paper feeding device 14, and a paper transport device 19, which are provided on or inside a main body 11.

The pipe connection decision device 30 includes a storage device 13, an operation device 47, and a control device 10 to be subsequently described.

The operation device 47 is an operation panel for receiving instructions from the user to execute the functions and operations that the image forming apparatus 1 is configured to perform, for example an image recording operation. The operation device 47 includes a display device 473 for displaying, for example, an operation guide for the user. The display device 473 includes a touch panel provided on the front face. The user can operate the image forming apparatus 1 by touching buttons and keys displayed on the screen.

To perform the document reading operation, the image forming apparatus 1 operates as follows. The document reading device 5 optically reads the image on a source document delivered from the document feeding device 6 or placed on a platen glass 161, and generates source image data. The source image data generated by the document reading device 5 is stored, for example, in an image memory or the storage device 13.

The storage device 13 is a large-capacity storage device such as a hard disk drive (HDD).

The document reading device 5 includes a reading mechanism 163 having a light emitter and a charge coupled device (CDC) sensor. The document reading device 5 illuminates the source document with the light emitter having a light source, and receives the reflected light with the CCD sensor, thereby reading the image from the source document.

To perform the image forming operation, the image forming apparatus 1 operates as follows. The image recording device 12 records an image on a sheet P, delivered from the paper feeding device 14 and transported by the paper transport device 19, on the basis of the source image data generated through the document reading operation, stored in the image memory, or received from a computer connected via a network.

The paper feeding device 14 includes a paper cassette 141. A feed roller 145 is provided on the upper side of the paper cassette 141, to feed the sheet P stored in the paper cassette 141 toward a transport route 190.

The paper feeding device 14 also includes a manual bypass tray 142, attached to a wall face of the main body 11, so as to be opened and closed. The sheet P set on the manual bypass tray 142 is delivered to the transport route 190 by a feed roller 146.

The paper transport device 19 includes the transport route 190 along which the sheet P is transported from the paper feeding device 14 to an output tray 151, a transport roller pair 191 located at a predetermined position on the transport route 190, and a discharge roller pair 192.

The sheet P delivered from the paper feeding device 14 is introduced into the transport route 190 by the transport roller pair 191. The sheet P, on which an image has been formed by the image recording device 12, is transported along an outgoing transport route 193 (part of the transport route 190) in a face-up orientation, and then discharged to the output tray 151 by the discharge roller pair 192.

The paper transport device 19 also includes an offset mechanism, configured to displace the discharge roller pair 192 in a right angle direction with respect to the sheet transport direction, to shift the sheet P to be discharged to the output tray 151 in the width direction of the recording sheet.

The image recording device 12 records the image based on the source image data, on the sheet P delivered from the paper feeding device 14 and transported along the transport route 190. The image recording device 12 includes a drive roller 125A, a follower roller 125B, an adsorption roller 126, a tension roller 127, a conveyor belt 128, an ink jet head 121, an ink tank unit 122, and an ink supply device 123.

The conveyor belt 128 is an endless belt, wound over the drive roller 125A, the follower roller 125B, and the tension roller 127. The drive roller 125A is driven by a motor to rotate counterclockwise. When the drive roller 125A is made to rotate, the conveyor belt 128 runs counterclockwise, and the follower roller 125B and the tension roller 127 are made to also rotate counterclockwise.

The tension roller 127 serves to maintain the tension of the conveyor belt 128 at an appropriate level. The adsorption roller 126 is opposed, in contact with the conveyor belt 128, to the follower roller 125B, and charges the conveyor belt 128 so as to electrostatically adsorb the sheet P, delivered from the paper feeding device 14, to the conveyor belt 128.

The ink jet head 121 ejects ink droplets of four different colors (black, cyan, magenta, and yellow) onto the sheet P being transported by the paper transport device 19, thereby sequentially recording an image. In the ink tank unit 122, the mentioned color inks are loaded, which are supplied to the ink jet head 121. The ink supply device 123 supplies those color inks to the ink tank unit 122.

Figure 3:
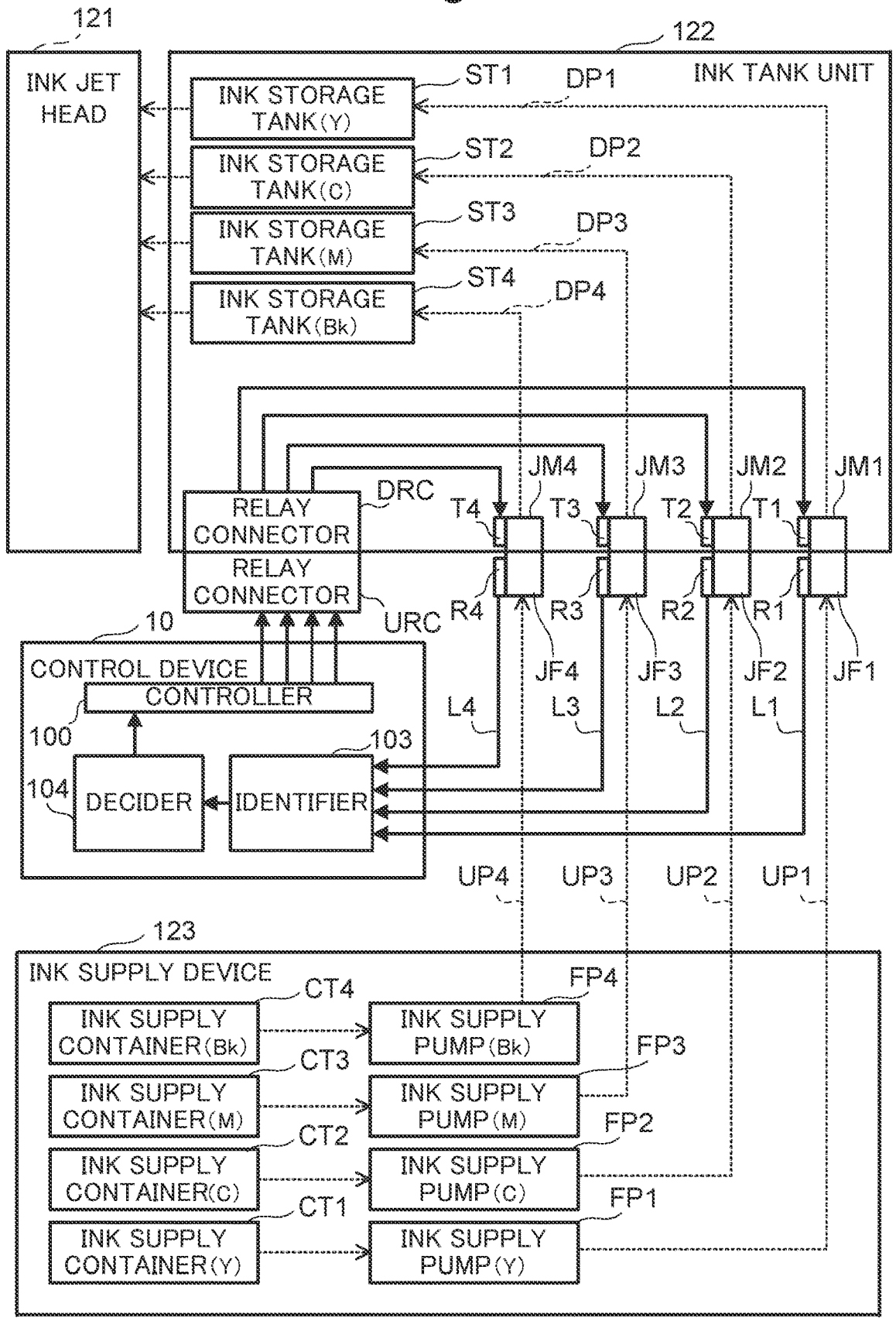
FIG. 3 is a schematic diagram showing color ink flow paths of an image recording device, and a system for checking pipe connection on the color ink flow paths, with a control device.
Figure 4:
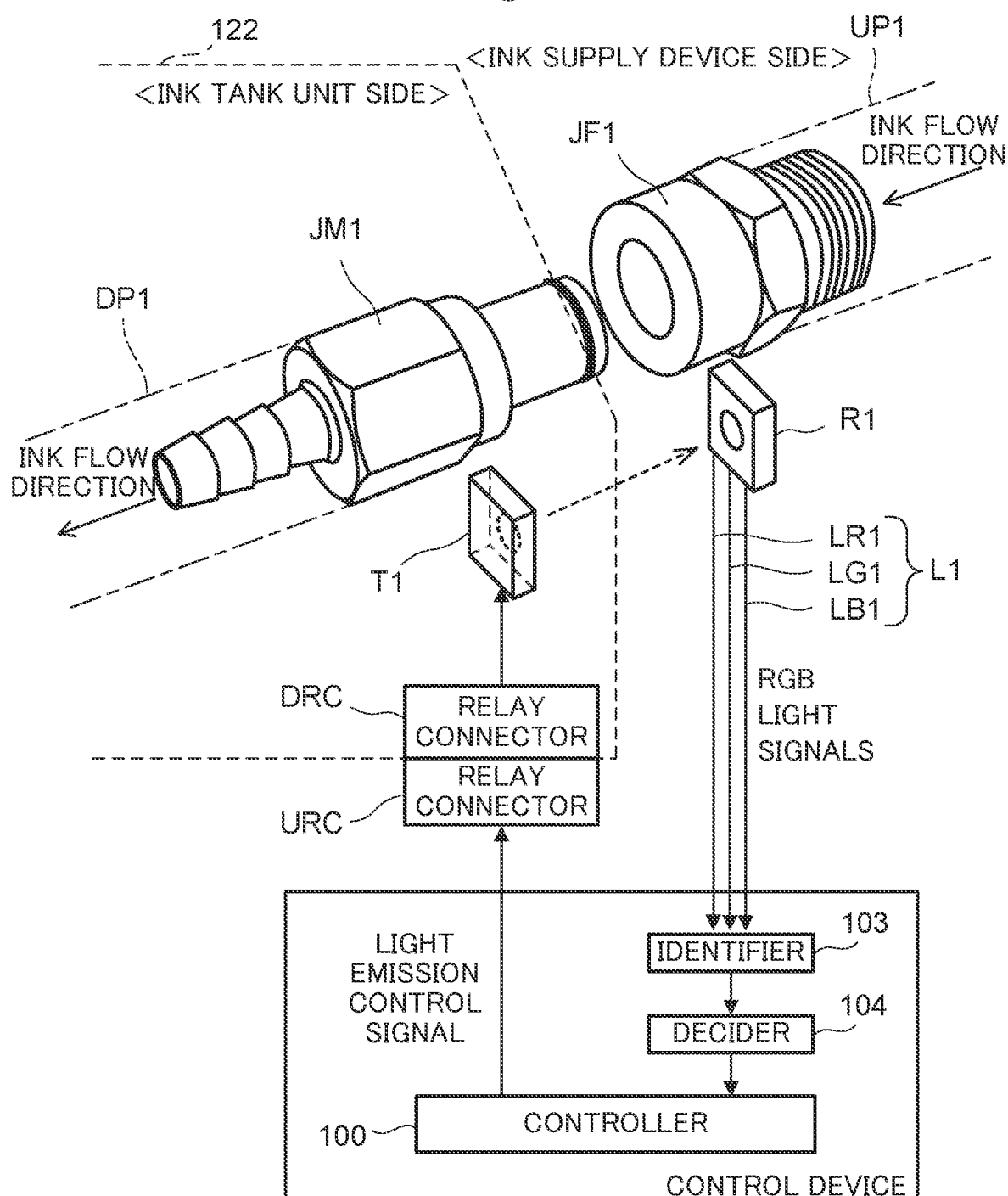
FIG. 4 is a perspective view accompanied with a schematic diagram, showing a system for checking connection between a connector receiver of a first pipe for yellow from an ink tank unit and a connector of a second pipe for yellow from an ink supply device.

Referring now to FIG. 3, ink flow paths for the respective color inks in the ink tank unit 122 and the ink supply device 123 will be described hereunder. FIG. 3 schematically illustrates the ink flow paths for the respective color inks in the image recording device, and a system for checking the pipe connection on the ink flow paths, with a control device. FIG. 4 schematically illustrates a system for checking the connection between a connector receiver of a first pipe for yellow from the ink tank unit, and a connector of a second pipe for yellow from the ink supply device.

The ink tank unit 122 (first material) includes ink storage tanks ST1 to ST4 for temporarily storing the respective color inks, and first pipes DP1 to DP4 respectively provided for the ink storage tanks ST1 to ST4. In the ink tank unit 122, connector receivers JM1 to JM4, which are male-type connectors of the same shape, and respectively attached to one end of the four first pipes DP1 to DP4, are aligned on a predetermined location. In FIG. 3, the four connector receivers JM1 to JM4 are linearly aligned in a row. On the predetermined location, name plates indicating the type of the first pipes DP1 to DP4, or the ink colors yellow (Y), cyan (C), magenta (M), and black (Bk), are attached to positions respectively corresponding to the four connector receivers JM1 to JM4. The four connector receivers JM1 to JM4 may be collectively aligned in two rows in horizontal and vertical directions. The four first pipes DP1 to DP4 are respectively connected to the ink storage tanks ST1 to ST4, at the other end. Hereinafter, the connector receivers JM1 to JM4 may be unspecifically referred to as connector receiver JM.

The ink supply device 123 (second material) includes an ink supply container CT1 for yellow, an ink supply container CT2 for cyan, an ink supply container CT3 for magenta, and an ink supply container CT4 for black, an ink supply pump FP1 for yellow, an ink supply pump FP2 for cyan, an ink supply pump FP3 for magenta, an ink supply pump FP4 for black, and second pipes UP1 to UP4 respectively provided for the four ink supply pumps FP1 to FP4. Joints JF1 to JF4 (connector), which are female-type connectors respectively provided at one end of the second pipes UP1 to UP4, have the same shape, and therefore can be connected to any of the four connector receivers JM1 to JM4 of the ink tank unit 122. In addition, name plates indicating the type of the second pipes, or the ink colors yellow (Y), cyan (C), magenta (M), and black (Bk), are respectively attached to the second pipes UP1 to UP4, at positions close to the connectors JF1 to JF4.

It is to minimize the burden on designing and manufacturing, which may be imposed when the joint sections for the respective colors are given different shapes, that the connector receivers JM1 to JM4, and the connectors JF1 to JF4, are formed in the same shape. Hereinafter, the connectors JF1 to JF4 may be unspecifically referred to as connector JF.

In addition, the second pipes UP1 to UP4 all have the same flow path length, the connectors JF1 to JF4 all have the same shape, the connector receivers JM1 to JM4 all have the same shape, and the first pipes DP1 to DP4 all have the same flow path length. Therefore, the flow paths for the respective color inks all have the same length.

The four connector receivers JM1 to JM4 are respectively provided with light emitters T1 to T4, configured to output light of a predetermined color among a plurality of colors. The light emitters T1 to T4 are, for example, each located at a predetermined position on the outer circumferential portion of the corresponding connector receiver. The four light emitters T1 to T4 output light of different colors, predetermined with respect to the connector receivers JM1 to JM4, according to a light emission control signal from a controller 100 to be subsequently described. For example, the light emitter T1 outputs yellow light, the light emitter T2 outputs blue light, the light emitter T3 outputs red light, and the light emitter T4 outputs purple light.

More specifically, the light emitters T1 to T4 are color LEDs each including light emitting elements of red (R), green (G), and blue (B), configured to output light of a desired color, depending on the light emitting pattern of these three light emitting elements. For example, the yellow light can be outputted, with the light emitting pattern that the light emitting element of red (R) and the light emitting element of green (G) are turned on, and the light emitting element of blue (B) is turned off. The blue light can be outputted, with the light emitting pattern that only the light emitting element of blue (B) is turned on. The red light can be outputted, with the light emitting pattern that only the light emitting element of red (R) is turned on. The purple light can be outputted, with the light emitting pattern that the light emitting element of red (R) and the light emitting element of blue (B) are turned on, and the light emitting element of green (G) is turned off. Hereinafter, the light emitters T1 to T4 may be unspecifically referred to as light emitter T.

The controller 100 outputs the light emission control signal to the light emitters T1 to T4, through a first cable, a relay connector URC, a relay connector DRC, and a second cable.

The four connectors JF1 to JF4 are respective provided with light receivers R1 to R4, each constituted as an RGB color sensor including photodetectors for red (R), green (G), and blue (B). For example, the light receiver R1 is located at a position on the outer circumferential portion of the connector JF1, so as to oppose the light emitter T1 of the connector receiver JM1 when the connector receiver JM1 and the connector JF1 are connected to each other, and configured to receive the yellow light from the light emitter T1. The light receivers R2 to R4 are also located in the same way as the light receiver R1. The light receiver R2 receives the blue light from the light emitter T2, the light receiver R3 receives the red light from the light emitter T3, and the light receiver R4 receives the purple light from the light emitter T4. Hereinafter, the light receivers R1 to R4 may be unspecifically referred to as light receiver R.

As shown in FIG. 3, signal lines L1 to L4 from the light receivers R1 to R4 are connected to the control device 10. The signal line L1 includes, as shown in FIG. 4, a red signal line LR1 for transmitting a red light intensity signal, a green signal line LG1 for transmitting a green light intensity signal, and a blue signal line LB1 for transmitting a blue light intensity signal. The signal lines L2 to L4 also each include, like the signal line L1, three signal lines. An identifier 103 identifies, as will be subsequently described, the color of received light with respect to each of the light receivers R1 to R4, using the light intensity signal of red, green, and blue, which are the three primary colors of light, from the light receivers R1 to R4.

The image forming apparatus 1 includes, as shown in FIG. 2, the control device 10, the document feeding device 6, the document reading device 5, the image recording device 12, the paper feeding device 14, the paper transport device 19, a cleaning device 22, the operation device 47, and a network interface (I/F) 91.

The paper feeding device 14 and the paper transport device 19 respectively include roller drivers 14A and 19A. The roller drivers 14A and 19A each include a motor, gears, and a driver. The roller driver 14A is an energy source that gives rotative force to the feed rollers 145 and 146. The roller driver 19A is an energy source that gives rotative force to the respective drive rollers of the transport roller pair 191 and the discharge roller pair 192.

The cleaning device 22 is for cleaning the ink jet head 121 of the image recording device 12. The cleaning device 22 includes, for example, a cleaning roller impregnated with a cleaning solution, to wipe off the ink stuck to the nozzle surface of the ink jet head 121, with the cleaning roller.

The network I/F 91 is a communication interface including a communication module, and configured to transmit and receive various types of data, to and from an external device 20 such as a personal computer or a server in a local network area, or on the internet.

The control device 10 includes a processor, a random-access memory (RAM), a read-only memory (ROM), and an exclusive hardware circuit. The processor is, for example, a central processing device (CPU), an application specific integrated circuit (ASIC), or a micro processing device (MPU).

The control device 10 acts as the controller 100, an operation receiver 101, a mode setter 102, the identifier 103, and a decider 104, when the processor operates according to a control program stored in a built-in non-volatile memory. Here, the controller 100 and other elements may each be constituted in the form of a hardware circuit, instead of being realized by the operation of the control device 10 according to the control program. This also applies to other embodiments, unless otherwise specifically noted.

The controller 100 controls the overall operation of the image forming apparatus 1. The controller 100 is connected to the document feeding device 6, the document reading device 5, the image recording device 12, the storage device 13, the paper feeding device 14, the paper transport device 19, the cleaning device 22, the operation device 47, and the network I/F 91, to control the operation of the mentioned components.

The operation receiver 101 receives inputs performed by the user through the operation device 47. For example, when the operation receiver 101 receives an instruction from the user to execute a printing job (e.g., copying or printing), the controller 100 controls the operation of the paper feeding device 14, the paper transport device 19, and the image recording device 12, so as to form the image based on the source image data designated by the user, on the sheet P delivered by the paper feeding device 14.

The storage device 13 contains, in advance, the data of the color emitted from the light emitters T1 to T4 respectively provided on the four connector receivers JM1 to JM4, and an allocated color to be received by each of the light receivers R1 to R4, respectively provided on the four connectors JF1 to JF4. FIG. 5A shows a cross-reference table TB stored in the storage device 13, and indicating correlations between the light emitter for each color on the side of the ink tank unit, and the light receiver for each color on the side of the ink supply device. The cross-reference table TB presents the color for each ink flow path, the light emitters, the color of the light emitted from the light emitters, the light receivers, and the allocated colors, in association with one another.

More specifically, in the cross-reference table TB, "Y" representing the yellow ink flow path, "T1" representing the light emitter T1, "Yellow" representing the color of the light emitted from the light emitter T1, "R1" representing the light receiver R1, and "Yellow" representing the allocated color, are associated with one another, "C" representing the cyan ink flow path, "T2" representing the light emitter T2, "Blue" representing the color of the light emitted from the light emitter T2, "R2" representing the light receiver R2, and "Blue" representing the allocated color, are associated with one another, "M" representing the magenta ink flow path, "T3" representing the light emitter T3, "Red" representing the color of the light emitted from the light emitter T3, "R3" representing the light receiver R3, and "Red" representing the allocated color, are associated with one another, and "Bk" representing the black ink flow path, "T4" representing the light emitter T4, "Purple" representing the color of the light emitted from the light emitter T4, "R4" representing the light receiver R4, and "Purple" representing the allocated color, are associated with one another.

Here, although the color for each ink flow path, the light emitters, the color of the light emitted from the light emitters, the light receivers, and the allocated colors are associated with one another, in the cross-reference table TB shown in FIG. 5A, different combinations may be adopted. The cross-reference table TB may be modified, for example, as shown in FIG. 5B. Identification numbers "TX01", "TX02", "TX03", and "TX04" are respectively given to the light emitters T1 to T4 for the different ink colors, and these identification numbers "TX01", "TX02", "TX03", and "TX04" are indicated in the modified cross-reference table TB shown in FIG. 5B, instead of the light emitters. Likewise, identification numbers "RX01", "RX02", "RX03", and "RX04" are respectively given to the light receivers R1 to R4 for the different colors, and these identification numbers "RX01", "RX02", "RX03", and "RX04" are indicated in the modified cross-reference table TB shown in FIG. 5B, instead of the light receivers.

The identifier 103 identifies the color of the light received by each of the four light receivers R1 to R4. For example, a plurality of light patterns indicating the combinations of the three signals of red, green, and blue, associated with the allocated colors indicated in the cross-reference table TB shown in FIG. 5A, are stored in advance in the storage device 13. The identifier 103 identifies the color of the light received by the light receiver R1, by matching between the three light intensity signals of red, green, and blue, which are the three primary colors of light, from the light receiver R1, in other words the light intensity signals from the photodetectors for red (R), green (G), and blue (B) from the light receiver R1, and the plurality of light patterns stored in advance in the storage device 13. The identifier 103 also identifies the color of received light with respect to the light receivers R2 to RA, in the same way as with the light receiver R1.

More specifically, the identifier 103 identifies that the yellow light has been received, when the light intensity signal of red (R) and the light intensity signal of green (G) are of a level higher than a predetermined threshold, and the light intensity signal of blue (B) is of a level not higher than the threshold, because this combination accords with the yellow light pattern stored in the storage device 13, specified such that the red and green signals are on and the blue signal is off. The identifier 103 identifies that the blue light has been received, when the light intensity signal of blue (B) is of a level higher than the predetermined threshold, and the light intensity signal of red (R) and the light intensity signal of green (G) are of a level not higher than the threshold, because this combination accords with the blue light pattern stored in the storage device 13, specified such that the blue signal is on and the red and green signals are off. The identifier 103 identifies that the red light has been received, when the light intensity signal of red (R) is of a level higher than the predetermined threshold, and the light intensity signal of green (G) and the light intensity signal of blue (B) are of a level not higher than the threshold, because this combination accords with the red light pattern stored in the storage device 13, specified such that the red signal is on and the green and blue signals are off. The identifier 103 identifies that the purple light has been received, when the light intensity signal of red (R) and the light intensity signal of blue (B) are of a level higher than the predetermined threshold, and the light intensity signal of green (G) is of a level not higher than the threshold, because this combination accords with the purple light pattern stored in the storage device 13, specified such that the red and blue signals are on and the green signal is off.

The decider 104 decides whether the color of the light, received by the light receiver R and identified by the identifier 103, accords with the allocated color of the same light receiver R stored in the storage device 13, with respect to each of the light receivers R1 to R4.

When the decider 104 decides that the color of received light accords with the allocated color, with respect to all of the light receivers R1 to R4, the controller 100 causes the display device 473 to display a message to the effect that the connectors JF1 to JF4 are all normally connected. In contrast, when the decider 104 decides that the color of received light discords with the allocated color, with respect to at least one of the light receivers R1 to R4, the controller 100 causes the display device 473 to display a message to the effect that the connector JF, having the light receiver R decided by the decider 104 to have received the discording color, is wrongly connected.

In addition, when the decider 104 decides that the color of received light discords with the allocated color, with respect to at least one of the light receivers R1 to RA, the controller 100 causes the display device 473 to display a work suggestion indicating the correct connector receiver for the connector JF decided to be wrongly connected, along with the message to the effect that the connector JF, having the light receiver R decided by the decider 104 to have received the discording color, is wrongly connected.

When all of the three light intensity signals (light intensity signals of red (R), green (G), and blue (B) from the respective photodetectors) from the light receiver R1 are of a level not higher than the predetermined threshold, the identifier 103 decides that the light receiver R1 has failed to receive the signal, instead of identifying the color of received light. In this case, the controller 100 causes the display device 473 to display a message to the effect that the connector JF1, having the light receiver R1 decided by the identifier 103 to have failed to receive the signal, is unconnected. With respect to the light receivers R2 to R4 also, the identifier 103 decides whether any of the light receivers R2 to R4 has failed to receive the signal, as with the light receiver R1. The controller 100 causes the display device 473 to display a message to the effect that the connector JF, having the light receiver R decided by the identifier 103 to have failed to receive the signal, is unconnected.

When a maintenance instruction inputted by the user through the operation device 47 is received by the operation receiver 101, the mode setter 102 sets the image forming apparatus 1 to a maintenance mode.

When the maintenance mode is set by the mode setter 102, the identifier 103 identifies the color of received light, with respect to each of the light receivers R1 to R4. The decider 104 decides whether the color of the light, received by the light receiver R and identified by the identifier 103, accords with the allocated color of the same light receiver R stored in the storage device 13, with respect to each of the light receivers R1 to R4. When the decider 104 decides that the color of received light accords with the allocated color, with respect to all of the light receivers R1 to RA, the controller 100 causes the display device 473 to display the message to the effect that the connectors JF1 to JF4 are all normally connected. In contrast, when the decider 104 decides that the color of received light discords with the allocated color, with respect to at least one of the light receivers R1 to R4, the controller 100 causes the display device 473 to display the message to the effect that the connector JF, having the light receiver R decided by the decider 104 to have received the discording color, is wrongly connected.

When the maintenance mode is not set by the mode setter 102, the controller 100 may activate the light emitters T1 to T4 and the light receivers R1 to RA, at a predetermined time point for checking (e.g., every hour, or every day). In this case, when the identifier 103 is unable to identify the color of received light, or decides that all of the light intensity signals are of a level not higher than the predetermined threshold, with respect to at least one of the light receivers R1 to RA, the controller 100 causes the display device 473 to display a message to the effect that there is a malfunction in the light receiver R about which the color of received light is unable to be identified, in the light receiver R in which all the light intensity signals are of a level not higher than the predetermined threshold, or in the corresponding light emitter T.

Figure 6:
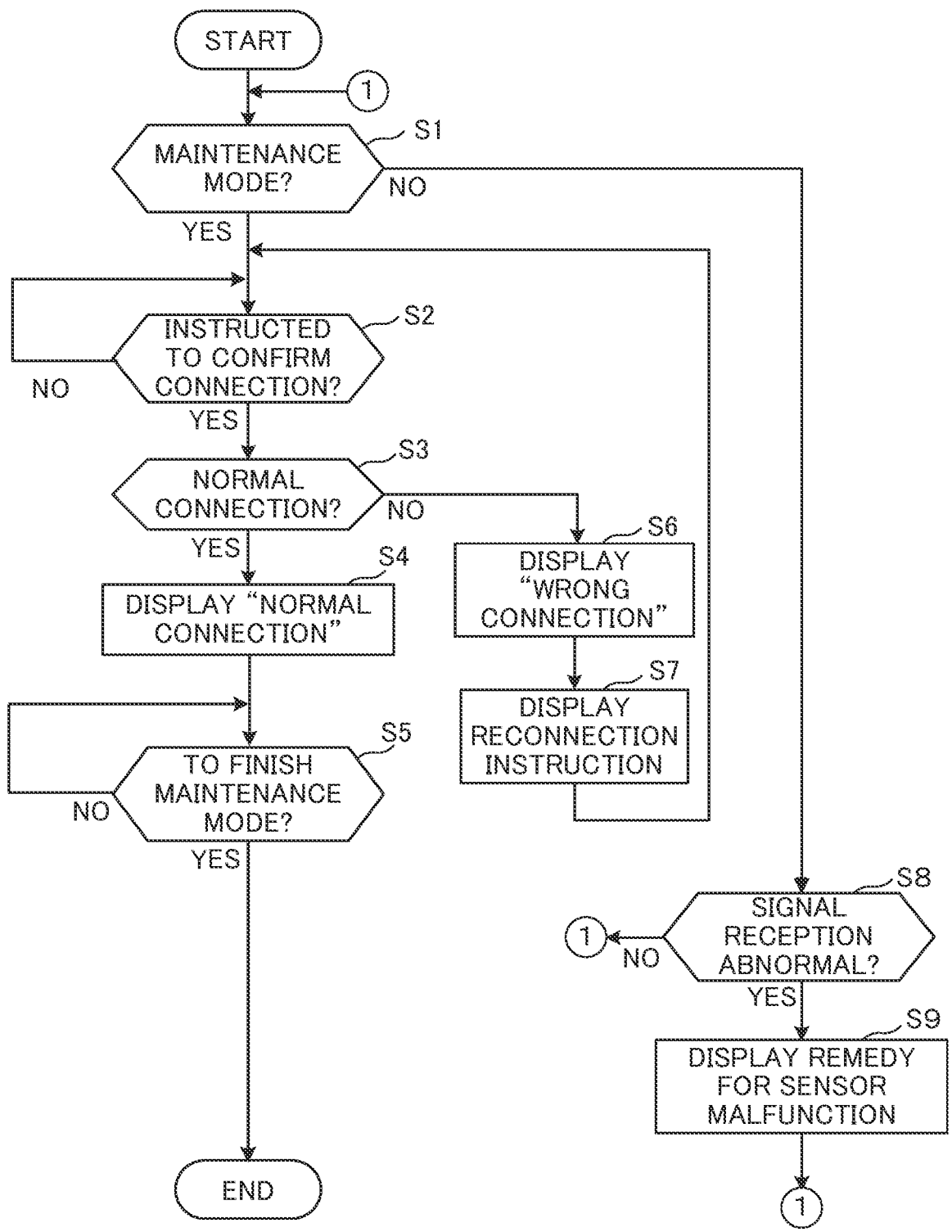
FIG. 6 is a flowchart showing an operation performed by the control device of the image forming apparatus according to the first embodiment.

Hereunder, an example of the operation performed by the control device 10 of the image forming apparatus 1 according to the first embodiment will be described, with reference to FIG. 6 and FIG. 7. FIG. 6 is a flowchart showing the operation performed by the control device 10 of the image forming apparatus 1 according to the first embodiment. FIG. 7 illustrates an example of the operation device.

First, the controller 100 causes the display device 473 to display a menu screen G1 shown in FIG. 7. The menu screen G1 includes a plurality of touch keys 61A to 61H, respectively associated with the functions of the image forming apparatus 1. When the user touches the touch key 61H associated with the maintenance mode, the touch panel provided on the display device 473 detects that the touch key 61H has been touched, and this touch operation is received by the operation receiver 101. When the selection of the maintenance mode made by the user through the operation device 47 is received by the operation receiver 101, the mode setter 102 sets the image forming apparatus 1 to the maintenance mode.

The controller 100 decides whether the image forming apparatus 1 is in the maintenance mode (step S1). When the mode setter 102 has set the image forming apparatus 1 to the maintenance mode, the controller 100 decides that the image forming apparatus 1 is in the maintenance mode (YES at step S1).

For the purpose of the description, it will be assumed that a maintenance work, including replacing the ink tank unit 122, and connecting the connectors JF1 to JF4 attached to one end of the second pipes UP1 to UP4 of the ink supply device 123, to the connector receivers JM1 to JM4 of the ink tank unit 122, respectively, has been carried out by the user.

The controller 100 decides whether the operation receiver 102 has received an instruction to confirm the connection, inputted by the user through the operation device 47 (step S2). The controller 100 causes the display device 473 to display a button expressed as "Confirm Connection", and decides that the operation receiver 102 has received the instruction to confirm the connection, when the button of "Confirm Connection" is touched (YES at step S2). In the case where the operation receiver 102 has not received the instruction to confirm the connection (NO at step S2), in other words, in the case where the button of "Confirm Connection" has not been touched, the controller 100 returns to step S2, and stands by for the instruction to confirm the connection to be received.

When the operation receiver 102 receives the instruction to confirm the connection (YES at step S2), the decider 104 decides whether the connection is normal (step S3).

Figure 8B:
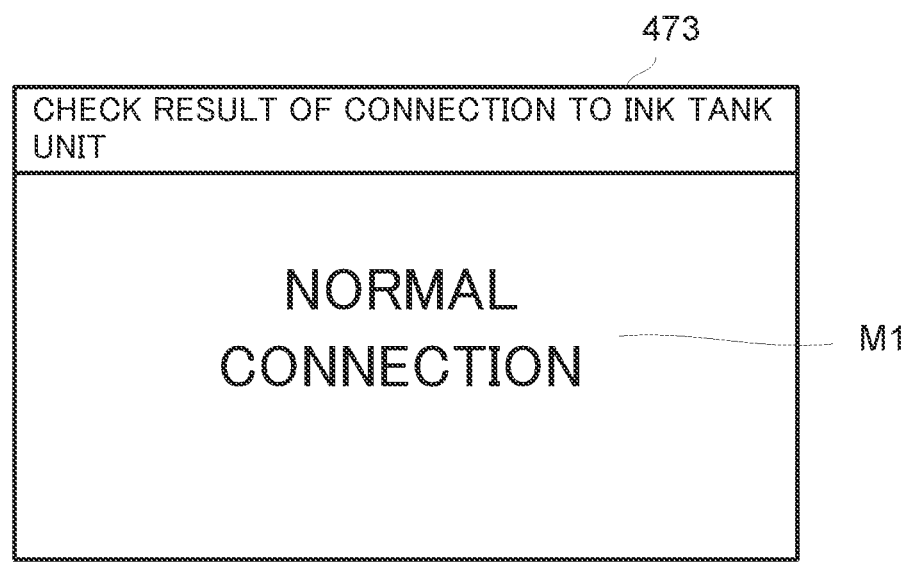
FIG. 8B is a schematic drawing showing an example of a screen displaying the decision result indicating normal connection.

Referring to FIG. 8A and FIG. 8B, the operation performed when the connection is normal will be described hereunder. FIG. 8A illustrates a table presenting the decision result that the connection is normal, provided by the decider. FIG. 8B illustrates an example of the screen displaying the decision result that the connection is normal.

The storage device 13 contains, in addition to the cross-reference table TB shown in FIG. 5A, a decision result table RTB indicating the light patterns identified by the identifier 103, the colors of the received light and the signal reception level, and the decision result provided by the decider 104, as shown in FIG. 8A.

The identifier 103 stores the three light patterns of red, green, and blue in the column of "Light Pattern" for the light receiver R1 shown in FIG. 8A, for example according to the light intensity signals from the photodetectors of red (R), green (G), and blue (B) in the light receiver R1. The identifier 103 also stores "Exceeding Threshold" in the column of "Reception Level" shown in FIG. 8A, because the signal reception levels of the three light intensity signals are higher than the predetermined threshold. Then the identifier 103 decides that the light pattern "Red: On, Green: On, Blue: Off" stored in the column of "Light Pattern" for the light receiver R1 shown in FIG. 8A, accords with the light pattern "Red: On, Green: On, Blue: Off" stored in the storage device 13 in the column of "Allocated Color", by the matching between each other. Thus, the identifier 103 identifies that the color of the light received by the light receiver R1 is yellow, and stores "Yellow" in the column of "Received Color" for the light receiver R1 shown in FIG. 8A. The decider 104 then decides that the color of the light received by the light receiver R1, identified as "Yellow" by the identifier 103, accords with the allocated color of the light receiver R1, stored as "Yellow" in the storage device 13, and stores "Normal" in the column of "Decision Result" for the light receiver R1 shown in FIG. 8A.

The identifier 103 also stores the three light patterns of red, green, and blue in the columns of "Light Pattern" for the light receivers R2 to RA shown in FIG. 8A, according to the light intensity signals from the photodetectors of red (R), green (G), and blue (B) in the light receivers R2 to R4. The identifier 103 also stores "Exceeding Threshold" in the column of "Reception Level" shown in FIG. 8A, because the signal reception levels of the three light intensity signals are higher than the predetermined threshold. The decider 104 then decides that the colors of the light received by the light receivers R2 to R4, respectively identified as "Blue", "Red", and "Purple" by the identifier 103, accord with the allocated colors of the light receivers R2 to R4, respectively stored as "Blue", "Red", and "Purple" in the storage device 13, and stores "Normal" in the column of "Decision Result" for the light receivers R2 to R4 shown in FIG. 8A.

When the modified cross-reference table TB shown in FIG. 5B is employed, the decision results of the modified pattern, indicating the normal connection as shown in FIG. 8C, are stored.

When the decider 104 decides that all of the connectors JF1 to JF4 are normally connected (YES at step S3), the controller 100 causes the display device 473 to display a message to the effect that the connection is normal, as shown in FIG. 8B (step S4). For example, the controller 100 causes the display device 473 to display a message M1 expressed as "Normal Connection" as shown in FIG. 8B, to announce that the connection is normal.

After step S4, the controller 100 decides whether the operation receiver 102 has received an instruction to finish the maintenance mode (step S5). In the case where the operation receiver 102 has not received the instruction to finish (NO at step S5), the controller 100 returns to step S5, and stands by for the instruction to finish to be received.

When the operation receiver 102 has received the instruction to finish the maintenance mode (YES at step S5), the controller 100 causes the mode setter 102 to cancel the maintenance mode, and finishes the series of operation.

Now, when the decider 104 decides that the connection is not normal at step S3 (NO at step S3), the controller 100 causes the display device 473 to display a message to the effect that the connection is wrong (step S6).

Referring to FIG. 9A and FIG. 9B, the operation performed when the connection is wrong will be described hereunder. FIG. 9A illustrates a table presenting the decision result that the connection is wrong, provided by the decider. FIG. 9B illustrates an example of the screen displaying the decision result that the connection is wrong.

The storage device 13 contains, in addition to the cross-reference table TB shown in FIG. 5A, the decision result table RTB indicating the light patterns identified by the identifier 103, the colors of the received light and the signal reception level, and the decision result provided by the decider 104, as shown in FIG. 9A.

The identifier 103 stores the three light patterns of red, green, and blue in the column of "Light Pattern" for the light receiver R1 shown in FIG. 9A, for example according to the light intensity signals from the photodetectors of red (R), green (G), and blue (B) in the light receiver R1. The identifier 103 also stores "Exceeding Threshold" in the column of "Reception Level" shown in FIG. 9A, because the signal reception levels of the three light intensity signals are higher than the predetermined threshold. Then the identifier 103 decides that the light pattern "Red: On, Green: On, Blue: Off" stored in the column of "Light Pattern" for the light receiver R1 shown in FIG. 9A, accords with the light pattern "Red: On, Green: On, Blue: Off" stored in the storage device 13 in the column of "Allocated Color", by the matching between each other. Thus, the identifier 103 identifies that the color of the light received by the light receiver R1 is yellow, and stores "Yellow" in the column of "Received Color" for the light receiver R1 shown in FIG. 9A. The decider 104 then decides that the color of the light received by the light receiver R1, identified as "Yellow" by the identifier 103, accords with the allocated color of the light receiver R1, stored as "Yellow" in the storage device 13, and stores "Normal" in the column of "Decision Result" for the light receiver R1 shown in FIG. 9A.

The identifier 103 stores the three light patterns of red, green, and blue in the column of "Light Pattern" for the light receiver R2 shown in FIG. 9A, for example according to the light intensity signals from the photodetectors of red (R), green (G), and blue (B) in the light receiver R2. The identifier 103 also stores "Exceeding Threshold" in the column of "Reception Level" shown in FIG. 9A, because the signal reception levels of the three light intensity signals are higher than the predetermined threshold. Then the identifier 103 decides that the light pattern "Red: On, Green: Off, Blue: Off" stored in the column of "Light Pattern" for the light receiver R2 shown in FIG. 9A, discords with the light pattern "Red: Off, Green: Off, Blue: On" stored in the storage device 13 in the column of "Allocated Color", by the matching between each other. Thus, the identifier 103 identifies that the color of the light received by the light receiver R2 is red, on the basis of "Red: On, Green: Off, Blue: Off" stored in the column of "Light Pattern" for the light receiver R2, and stores "Red" in the column of "Received Color" for the light receiver R2 shown in FIG. 9A. The decider 104 then decides that the color of the light received by the light receiver R2, identified as "Red" by the identifier 103, discords with the allocated color of the light receiver R2, stored as "Blue" in the storage device 13, and stores "Wrong" in the column of "Decision Result" for the light receiver R2 shown in FIG. 9A.

The identifier 103 stores the three light patterns of red, green, and blue in the column of "Light Pattern" for the light receiver R3 shown in FIG. 9A, for example according to the light intensity signals from the photodetectors of red (R), green (G), and blue (B) in the light receiver R3. The identifier 103 also stores "Exceeding Threshold" in the column of "Reception Level" shown in FIG. 9A, because the signal reception levels of the three light intensity signals are higher than the predetermined threshold. Then the identifier 103 decides that the light pattern "Red: Off, Green: Off, Blue: On" stored in the column of "Light Pattern" for the light receiver R3 shown in FIG. 9A, discords with the light pattern "Red: On, Green: Off, Blue: Off" stored in the storage device 13 in the column of "Allocated Color", by the matching between each other. Thus, the identifier 103 identifies that the color of the light received by the light receiver R3 is blue, on the basis of "Red: Off, Green: Off, Blue: On" stored in the column of "Light Pattern" for the light receiver R3, and stores "Blue" in the column of "Received Color" for the light receiver R3 shown in FIG. 9A. The decider 104 then decides that the color of the light received by the light receiver R3, identified as "Blue" by the identifier 103, discords with the allocated color of the light receiver R3, stored as "Red" in the storage device 13, and stores "Wrong" in the column of "Decision Result" for the light receiver R3 shown in FIG. 9A.

The identifier 103 stores the three light patterns of red, green, and blue in the column of "Light Pattern" for the light receiver R4 shown in FIG. 9A, for example according to the light intensity signals from the photodetectors of red (R), green (G), and blue (B) in the light receiver R4. The identifier 103 also stores "Not Exceeding Threshold" in the column of "Reception Level" shown in FIG. 9A, because the signal reception levels of the three light intensity signals are not higher than the predetermined threshold. Then the identifier 103 decides that the light receiver R4 is unable to receive the signal, instead of performing the matching between the light pattern "Red: Off, Green: Off, Blue: Off" stored in the column of "Light Pattern" for the light receiver R4 shown in FIG. 9A, and the light pattern "Red: On, Green: Off, Blue: On" stored in the storage device 13 in the column of "Allocated Color", and stores "N/A" indicating that the color is unidentified, in the column of "Received Color" for the light receiver R4. The decider 104 stores "Wrong" in the column of "Decision Result" for the light receiver R4 shown in FIG. 9A, because the identifier 103 has decided that the light receiver R4 is unable to receive the signal.

The controller 100 stores the type of work to be done in the columns of "Work Type" in FIG. 9A, corresponding to the light receivers about which "Wrong" is stored in the column of "Decision Result", using the cross-reference table TB shown in FIG. 5A. For example, the controller 100 decides that the color of the light received by the light receiver R2 is "Red" is different from the allocated color, which is "Blue". Regarding the light receiver R2, the controller 100 stores "Connect to C" in the column of "Work Type" in FIG. 9A, according to "C" in the column of "Flow Path" for the light receiver R2 in the cross-reference table TB shown in FIG. 5A. Regarding the light receiver R3, likewise, the controller 100 stores "Connect to M" in the column of "Work Type" in FIG. 9A, according to "M" in the column of "Flow Path" for the light receiver R3 in the cross-reference table TB shown in FIG. 5A. Further, the controller 100 decides that the connector JF4 is incompletely connected, according to the decision made by the identifier 103 that the light receiver R4 is unable to receive the signal, and stores "Connect More Securely" in the column of "Work Type" in FIG. 9A.

When the decider 104 decides that the connection is wrong as above (NO at step S3), the controller 100 causes the display device 473 to display a message to the effect that the connection is wrong, as shown in FIG. 9B (step S6). For example, the controller 100 causes the display device 473 to display a warning message AM1 as "Wrong Connection" as shown in FIG. 9B, to announce that the connection is wrong.

Further, the controller 100 causes the display device 473 to display the detail of the reconnection work (step S7), according to the work to be done stored in the column of "Work Type" shown in FIG. 9A. More specifically, the controller 100 causes the display device 473 to display a work suggestion message AM2 as "Transfer Connector (C) on Connector Receiver (M) to Connector Receiver (C)", and a work suggestion message AM3 as "Transfer Connector (M) on Connector Receiver (C) to Connector Receiver (M)", as the work suggestion indicating the correct counterpart for the connector JF decided to be wrongly connected, and a work suggestion message AM4 as "Fasten Connector (Bk) More Securely" indicating the correct connection method of the connector JF4.

When the modified cross-reference table TB shown in FIG. 5B is employed, the decision results that the connection is wrong are stored in the modified pattern, as shown in FIG. 9C, are stored.

After step S7, the operation of the controller 100 returns to step S2.

In the case where the image forming apparatus 1 is not set to the maintenance mode by the mode setter 102, the controller 100 decides that the image forming apparatus 1 is not in the maintenance mode (NO at step S1), and activates the light emitters T1 to T4 and the light receivers R1 to R4 at a predetermined time point for checking (e.g., every hour, or every day), to thereby decide whether the signals are normally received (step S8).

When the identifier 103 is unable to identify the color of received light, or decides that all of the light intensity signals are of a level not higher than the predetermined threshold, with respect to at least one of the light receivers R1 to R4, the controller 100 decides that the signal has been abnormally received (YES at step S8), and causes the display device 473 to display the remedy for sensor malfunction (step S9), after which the operation returns to step S1. For example, the controller 100 causes the display device 473 to display a message to the effect that there is a malfunction in the light receiver R about which the color of received light is unable to be identified, in the light receiver R in which all the light intensity signals are of a level not higher than the predetermined threshold, or in the corresponding light emitter T.

In contrast, upon deciding that the signals are being normally received (NO at step S8), the controller 100 returns to step S1, and stands by until the next predetermined time point for checking.

Now, in the image forming apparatus, the connectors may be manually switched to rearrange the flow path, for example when replacing the ink tank unit, doing the maintenance work, or discharging a transport liquid from the ink tank unit loaded with the transport liquid, and refilling the ink tank unit with the regular ink. In such occasions, the connector may be wrongly connected, or left unconnected.

The existing image forming apparatuses are only configured to detect that the connector is unconnected, as result of detecting whether the connector is connected, and not configured to detect that the connector is wrongly connected, in other words the connector of a different color has been connected. Accordingly, the user is unable to be made aware of the wrong connection of the connector. In case the user continues with the mentioned work without the wrong connection of the connector being detected, just reconnecting the connector is not enough, but a large-scale repair work will be necessary for the target unit of the connection (e.g., ink tank unit) or a unit ahead thereof (e.g., ink jet head).

According to the first embodiment, in contrast, the decider 104 decides whether the color of the light, received by the light receiver R and identified by the identifier 103, accords with the allocated color of the same light receiver R stored in the storage device 13, with respect to each of the plurality of light receivers R1 to R4. When the decider 104 decides that the color of received light accords with the allocated color with respect to all of the plurality of light receivers R1 to R4, the controller 100 causes the display device 473 to display the message to the effect that the plurality of connectors JF1 to JF4 are all normally connected. When the decider 104 decides that the color of received light discords with the allocated color with respect to at least one of the plurality of light receivers R1 to R4, the controller 100 causes the display device 473 to display the message to the effect that the connector JF, having the light receiver R about which the decider 104 has decided that the color of received light discords with the allocated color, is wrongly connected. Therefore, the wrong connection of the connectors JF1 to JF4 can be detected, and notified to the user.

In the case of the image forming apparatus 1 of the ink jet system, in particular, the wrong connection of the connectors JF1 to JF4, provided between the ink supply device 123 and the ink tank unit 122, can be detected and notified to the user.

The controller 100 causes the display device 473 to also display the work suggestion (see FIG. 9B) indicating the correct counterpart for the connector JF decided to be wrongly connected, in addition to displaying the message that the connector JF, having the light receiver R about which the decider 104 has decided that the color of received light discords with the allocated color, is wrongly connected.

Therefore, the user can be made aware of how to correct the wrong connection of the connector JF, which leads to improved efficiency in the reconnection work for the connector JF.

Figure 10A:
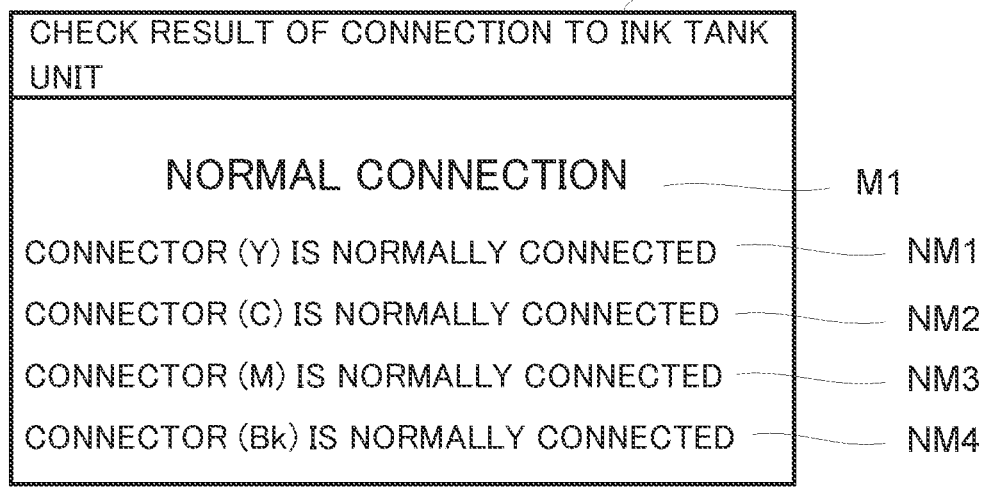
FIG. 10A is a schematic drawing showing another example of the screen displaying the decision result indicating normal connection.

FIG. 10A illustrates another example of the screen displaying the decision result indicating normal connection. FIG. 10B illustrates another example of the screen displaying the decision result indicating wrong connection. When the decider 104 decides that the color of received light accords with the allocated color, with respect to some of the plurality of light receivers R1 to RA, the controller 100 may cause the display device 473 to display, for example, normal connection messages NM1 to NM4, indicating that the connector JF having such light receiver R is normally connected, as shown in FIG. 10A and FIG. 10B. In this case, the user can also be made aware that the connector JF is normally connected.

The identifier 103 identifies the color of the light received by the light receivers R1 to R4, by matching between the three light intensity signals of red, green, and blue, which are the three primary colors of light, from the light receivers R1 to RA, and the plurality of light patterns indicating the combinations of the three signals of red, green, and blue, and stored in advance in the storage device 13. Therefore, the color of light received by the light receivers R1 to R4 can be accurately identified.

When all of the three light intensity signals of red, green, and blue from the light receiver R are of a level not higher than the predetermined threshold, the identifier 103 decides that the light receiver R has failed to receive the signal, instead of identifying the color of received light. The controller 100 causes the display device 473 to display a message to the effect that the connector JF, having the light receiver R decided by the identifier 103 to have failed to receive the signal, is incompletely connected. Therefore, the connector JF can be detected to be unconnected, and the user can be made aware that the connector JF is unconnected.

In the maintenance mode, the identifier 103 identifies the color of received light with respect to each of the plurality of light receivers R1 to RA, and the decider 104 decides whether the color of the light, received by the light receiver R and identified by the identifier 103, accords with the allocated color of the same light receiver R stored in the storage device 13, with respect to each of the plurality of light receivers R1 to R4. When the decider 104 decides that the color of received light accords with the allocated color with respect to all of the plurality of light receivers R1 to R4, the controller 100 causes the display device 473 to display the message to the effect that the plurality of connectors JF1 to JF4 are all normally connected. When the decider 104 decides that the color of received light discords with the allocated color with respect to at least one of the plurality of light receivers R1 to R4, the controller 100 causes the display device 473 to display the message to the effect that the connector JF, having the light receiver R about which the decider 104 has decided that the color of received light discords with the allocated color, is wrongly connected. Therefore, the wrong connection of the connectors JF1 to JF4 can be detected and notified to the user, in the maintenance mode. When the maintenance mode is not set, the controller 100 activates the plurality of light emitters T1 to T4 and the plurality of light receivers R1 to R4, only at a predetermined time point for checking. When the identifier 103 is unable to identify the color of light received by the light receiver R, or decides that all of the light intensity signals from the light receivers R1 to R4 are of a level not higher than the predetermined threshold, the controller 100 causes the display device 473 to display a message to the effect that there is a malfunction in the light receiver R about which the color of received light is unable to be identified, in the light receiver R in which all the light intensity signals are of a level not higher than the predetermined threshold, or in the corresponding light emitter T. Therefore, the condition of the light emitter T and the light receiver R (sensor) can be periodically checked, and the malfunction of the light emitter T and the light receiver R can be properly detected.

Figure 11:
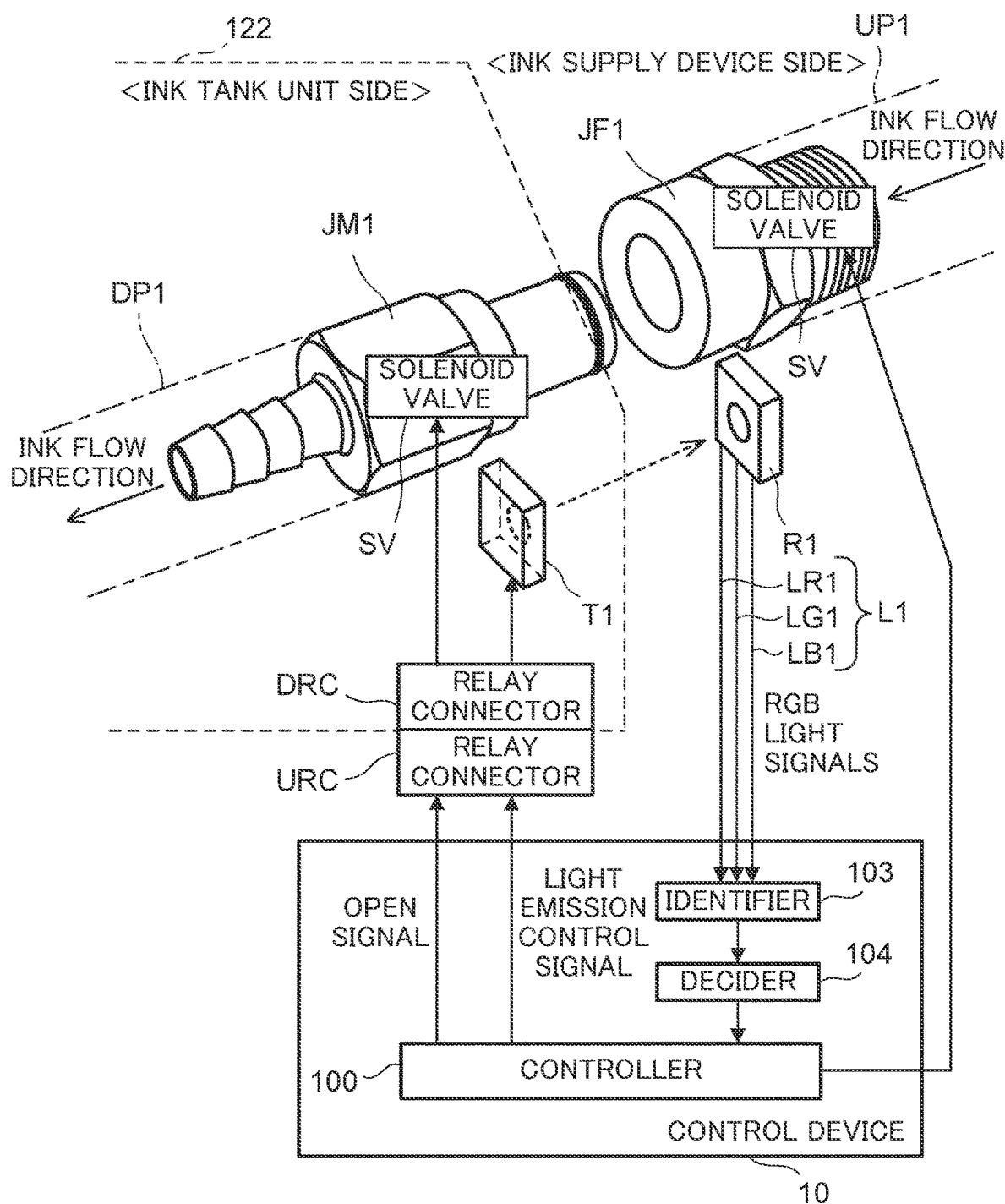
FIG. 11 is a perspective view accompanied with a schematic diagram, showing a system for checking connection between the connector receiver of the first pipe for yellow from the ink tank unit, and the connector of the second pipe for yellow from the ink supply device, in an image forming apparatus according to a second embodiment.

Hereunder, the image forming apparatus 1 according to a second embodiment will be described. FIG. 11 schematically illustrates a system for checking the connection between the connector receiver of the first pipe for yellow from the ink tank unit, and the connector of the second pipe for yellow from the ink supply device, in the image forming apparatus according to the second embodiment.

In the image forming apparatus 1 according to the second embodiment, the connector receivers JM1 to JM4 and the connectors JF1 to JF4 each include a solenoid valve SV (open/close device) to be closed when the maintenance mode is set, as shown in FIG. 11. The solenoid valve SV is switched to an open state from the closed state, according to an open signal from the controller 100, and therefore the controller 100 is additionally provided with the open/close function for the solenoid valve SV. In the description of the second embodiment, the description of the elements or configuration similar to those of the first embodiment will not be repeated.

When the decider 104 decides that the color of received light accords with the allocated color with respect to all of the light receivers R1 to RA, the controller 100 supplies the open signal to the respective solenoid valves SV of the connectors JF1 to JF4 having the light receivers R1 to R4, and respective solenoid valves SV of the connector receivers JM1 to JM4, to which the connectors JF1 to JF4 are respectively connected, thereby opening the solenoid valves SV on both sides. However, when the decider 104 decides that the color of received light discords with the allocated color, with respect to any of the light receivers R1 to R4, the controller 100 supplies the open signal to none of the solenoid valves SV of the connectors JF1 to JF4 having the light receivers R1 to RA, and none of the solenoid valves SV of the receivers JM1 to JM4 to which the connectors JF1 to JF4 are connected, thereby keeping the solenoid valve SV from being opened.

Figure 12:
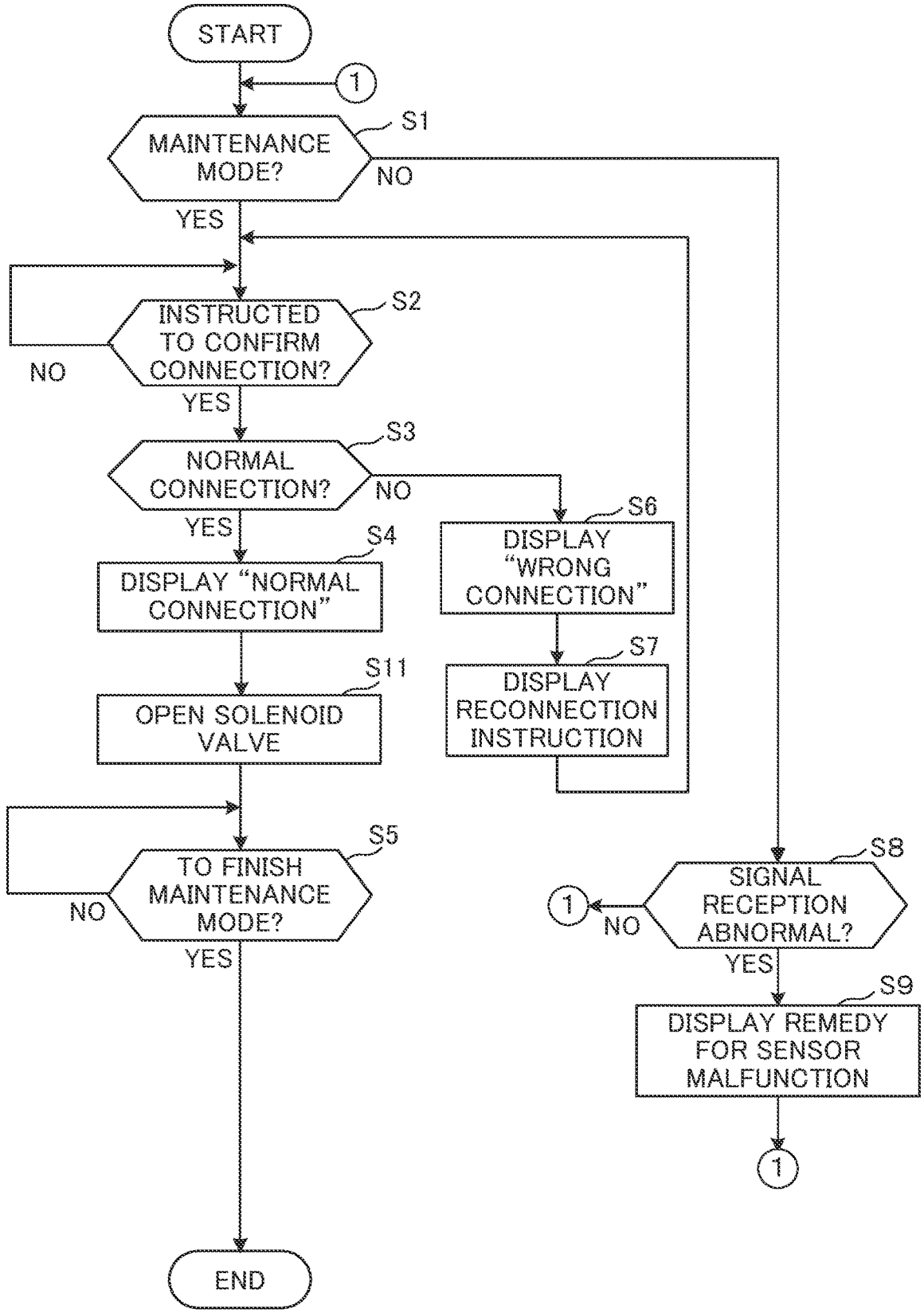
FIG. 12 is a flowchart showing an operation performed by the control device of the image forming apparatus according to the second embodiment.

Hereunder, an example of the operation performed by the control device 10 of the image forming apparatus 1 according to the second embodiment will be described, with reference to the flowchart shown in FIG. 12. Here, the flowchart of FIG. 12 is the same as that shown in FIG. 6, except that step S11, to be performed after step S4, is added, and therefore only step S11 will be described hereunder. In the second embodiment, the controller 100 closes the solenoid valves SV which have thus far been open, upon deciding that the image forming apparatus 1 is set to the maintenance mode (YES at step S1). In addition, the controller 100 causes the display device 473 to display the remedy for the sensor malfunction (step S9), when closing the solenoid valves SV.

At step S11, when the decider 104 decides that the color of received light accords with the allocated color with respect to all of the light receivers R1 to R4, in other words when the connection is normal (YES at step S3), the controller 100 supplies the open signal to the solenoid valves SV of the connectors JF1 to JF4 having the light receivers R1 to R4, and the solenoid valves SV of the connector receivers JM1 to JM4, to which the connectors JF1 to JF4 are connected, thereby opening the solenoid valves SV on both sides (step S11). However, when the decider 104 decides that the color of received light discords with the allocated color, with respect to any of the light receivers R1 to RA, in other words when the connection is wrong (NO at step S3), the controller 100 supplies the open signal to none of the solenoid valves SV of the connectors JF1 to JF4 having the light receivers R1 to RA, and none of the solenoid valves SV of the receivers JM1 to JM4 to which the connectors JF1 to JF4 are connected, thereby keeping the solenoid valve SV from being opened.

According to the second embodiment, the connector receivers JM1 to JM4 and the connectors JF1 to JF4 each include the solenoid valve SV to be closed when the maintenance mode is set. The solenoid valve SV is switched to the open state from the closed state, according to the open signal from the controller 100. When the decider 104 decides that the color of received light discords with the allocated color, with respect to any of the light receivers R1 to R4, the controller 100 supplies the open signal to none of the solenoid valves SV of the connectors JF1 to JF4 having the light receivers R1 to RA, and none of the solenoid valves SV of the receivers JM1 to JM4 to which the connectors JF1 to JF4 are connected, thereby keeping the solenoid valve SV from being opened. Therefore, the solenoid valves SV of the connectors JF1 to JF4, and the solenoid valves SV of the connector receivers JM1 to JM4 are opened only when all of the connectors JF1 to JF4 are normally connected, to allow the correct fluid to flow through. When any of the connectors JF1 to JF4 are wrongly connected, the solenoid valves SV of the connectors JF1 to JF4 and the solenoid valves SV of the connector receivers JM1 to JM4 are kept closed. Therefore, even though the connector JF is wrongly connected, the wrong fluid is kept from flowing through, and consequently a trouble arising from the supply of wrong fluid can be securely prevented.

Alternatively, the solenoid valve SV on the ink flow path about which the connection has been decided to be normal, out of the ink flow paths for the four colors, may be opened, while the solenoid valve SV on the ink flow path about which the connection has been decided to be wrong are kept closed. More specifically, the controller 100 may supply the open signal to the solenoid valve SV of the connector JF, having the light receiver R about which the decider 104 has decided that the color of received light accords with the allocated color, and the solenoid valve SV of the connector receiver JM to which the mentioned connector JF is connected, thereby opening the solenoid valves SV on both sides. On the other hand, the controller 100 may keep from supplying the open signal to the solenoid valve SV of the connector JF, having the light receiver R about which the decider 104 has decided that the color of received light discords with the allocated color, and the solenoid valve SV of the connector receiver JM to which the mentioned connector JF is connected, thereby keeping those solenoid valves SV from being opened. For example, such a step as "Open the solenoid valve SV on the normally connected ink flow path" may be added after step S7, in the flowchart shown in FIG. 12.

Although the solenoid valve SV is provided on both of the connector JF and the connector receiver JM, in the image forming apparatus 1 according to the second embodiment, the solenoid valve SV may be provided only on the connector JF. In this case, the controller 100 may supply the open signal to the solenoid valve SV of the connector JF, having the light receiver R about which the decider 104 has decided that the color of received light accords with the allocated color, out of the plurality of light receivers R1 to R4, thereby opening the solenoid valve SV, but may keep from supplying the open signal to the solenoid valve SV of the connector JF, having the light receiver R about which the decider 104 has decided that the color of received light discords with the allocated color, thereby keeping the solenoid valve SV from being opened. Therefore, the solenoid valve SV of the connector JF is opened only when the connector JF is normally connected, to allow the correct fluid to flow through. When the connector JF is wrongly connected, the solenoid valve SV of the wrongly connected connector JF is kept closed. Therefore, even though the connector JF is wrongly connected, the wrong fluid is kept from flowing through, and consequently a trouble arising from the supply of wrong fluid can be securely prevented.

The disclosure may be modified in various manners, without limitation to the foregoing embodiments. For example, although the MFP is taken up in the foregoing embodiments as an example of the image forming apparatus according to the disclosure, the disclosure is also applicable to various other image forming apparatuses having the printing function.

Although the connector receivers JM1 to JM4 are formed as male-type connectors in the foregoing embodiments, the connector receivers JM1 to JM4 may be formed as female-type connectors. In this case, the connectors JF1 to JF4 of the female type may be formed as male-type connectors.

Although the controller 100 checks the pipe connection between the ink tank unit 122 and the ink supply device 123 in the foregoing embodiments, the controller may check the pipe connection between the ink jet head 121 and the ink tank unit 122, or the pipe connection inside of the ink tank unit 122 or the ink supply device 123.

The configurations and processings described in the foregoing embodiments with reference to FIG. 1 to FIG. 12 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A pipe connection decision device comprising:
a first material including a plurality of first pipes each having a connector receiver attached to one end, the connector receivers having a same shape and aligned at a predetermined position;
a second material including a plurality of second pipes each having a connector attached to one end, the connectors having a same shape and being configured to be fitted to any of the connector receivers;
a plurality of light emitters respectively provided on the plurality of connector receivers, and each configured to output light of a predetermined color allocated to the corresponding connector receiver, the colors being different from each other;
a plurality of light receivers respectively provided on the plurality of connectors, and each configured to receive, when the connector receiver and the connector are coupled with each other, the light from the light emitter of the connector receiver coupled with the corresponding connector;
a storage device containing in advance the allocated color to be received by the light receiver, with respect to each of the plurality of connectors;
a display device; and
a control device,
wherein the control device includes a processor, and configured to act, when the processor executes a control program, as:
an identifier that identifies the color of the light received by each of the plurality of light receivers;
a decider that decides, with respect to each of the plurality of light receivers, whether the color of the light received by the light receiver and identified by the identifier accords with the allocated color stored in the storage device with respect the corresponding light receiver; and
a controller that causes the display device to (i) display a first message indicating that all of the plurality of connectors are normally connected, when the decider decides that the color of received light accords with the allocated color, with respect to all of the plurality of light receivers, and (ii) display, when the decider decides that the color of received light discords with the allocated color, with respect to at least one of the plurality of light receivers, a second message indicating that the connector, having the light receiver with respect to which the decider has decided that the color of received light discords with the allocated color, is wrongly connected.

2. The pipe connection decision device according to claim 1,
wherein, when the decider decides that the color of received light discords with the allocated color, with respect to at least one of the plurality of light receivers, the controller causes the display device to display the second message, and a first work suggestion indicating a correct counterpart to which the connector decided to be wrongly connected is to be connected.

3. The pipe connection decision device according to claim 1,
wherein, when the decider decides that the color of received light accords with the allocated color, with respect to one or more of the plurality of light receivers, the controller causes the display device to display a third message indicating that one or more connectors, respectively having the one or more light receivers, are normally connected.

4. The pipe connection decision device according to claim 1,
wherein the storage device contains in advance a plurality of light patterns each indicating a combination of three signals of red, green, and blue, and
the identifier identifies the color of light received by the light receiver, by matching between three light intensity signals of red, green, and blue received by the light receiver, and the plurality of light pattern stored in advance in the storage device.

5. The pipe connection decision device according to claim 4,
wherein, when all of the three light intensity signals received by the light receiver are of a level not higher than a predetermined threshold, the identifier decides that the light receiver is unable to receive the signal, instead of identifying the color of received light, and
the controller causes the display device to display a fourth message indicating that the connector, having the light receiver decided by the identifier to be unable to receive the signal, is unconnected.

6. The pipe connection decision device according to claim 5, wherein, when the identifier identifies the light receiver that is unable to receive the signal, the controller causes the display device to display the fourth message, and a second work suggestion indicating a correct connection method for the connector.

7. The pipe connection decision device according to claim 1,
wherein the connector includes an open/close device to be switched to an open state from a closed state, according to an open signal outputted from the controller, and
the controller supplies the open signal to the open/close device of the connector having the light receiver about which the decider has decided that the color of received light accords with the allocated color, out of the plurality of light receivers, thereby switching the open/close device to the open state from the closed state, but keeps from supplying the open signal to the open/close device of the connector having the light receiver about which the decider has decided that the color of received light discords with the allocated color, out of the plurality of light receivers, thereby keeping the open/close device closed, without opening the same.

8. The pipe connection decision device according to claim 1,
wherein the connector receiver and the connector each include an open/close device to be switched to an open state from a closed state, according to an open signal outputted from the controller, and
the controller supplies the open signal to the open/close device of the connector having the light receiver about which the decider has decided that the color of received light accords with the allocated color, out of the plurality of light receivers, and to the open/close device of the connector receiver to which the connector is connected, thereby switching the open/close devices on both sides to the open state from the closed state, but keeps from supplying the open signal to the open/close device of the connector having the light receiver about which the decider has decided that the color of received light discords with the allocated color, out of the plurality of light receivers, and to the open/close device of the connector receiver to which the connector is connected, thereby keeping the open/close devices on both sides closed, without opening the same.

9. The pipe connection decision device according to claim 8,
wherein, when the decider decides that the color of received light accords with the allocated color, with respect to all of the plurality of light receivers, the controller supplies the open signal to the respective open/close devices of the plurality of connectors, and to the respective open/close devices of the plurality of connector receivers, thereby switching the open/close devices on both sides to the open state from the closed state, but keeps from supplying the open signal to the open/close devices of the plurality of connectors and the open/close devices of the plurality of connector receivers, thereby keeping the open/close devices on both sides closed, without opening the same, when the decider decides that the color of received light discords with the allocated color, with respect to at least one of the plurality of light receivers.

10. The pipe connection decision device according to claim 1, further comprising an operation device to be operated by a user,
wherein the control device is configured to further act as:
an operation receiver that receives an input made by the user through the operation device; and
a mode setter that sets a maintenance mode when the operation receiver receives a maintenance instruction inputted by the user through the operation device,
when the maintenance mode is set by the mode setter, the identifier identifies the color of received light with respect to each of the plurality of light receivers, the decider decides whether the color of light, received by each of the plurality of light receivers and identified by the identifier, accords with the allocated color of each of the plurality of light receivers stored in the storage device, with respect to each of the plurality of light receivers, and the controller causes the display device to display the first message, when the decider decides that the color of received light accords with the allocated color, with respect to all of the plurality of light receivers, and to display the second message, when the decider decides that the color of received light discords with the allocated color with respect to at least one of the plurality of light receivers, and
when the maintenance mode is not set by the mode setter, the controller activates the plurality of light emitters and the plurality of light receivers at a predetermined time point for checking, and causes the display device, when the identifier is unable to identify the color of light received by the light receiver, or decides that light intensity signal from the light receiver is of a level not higher than a predetermined threshold, to display a fifth message indicating that there is a malfunction in the light receiver about which the color of received light is unable to be identified, in the light receiver in which the light intensity signal is of a level not higher than the predetermined threshold, or in the corresponding light emitter.

11. An image forming apparatus comprising:
the pipe connection decision device according to claim 1; and
an ink jet head that ejects ink of predetermined colors different from each other, onto a recording sheet,
wherein the second material includes an ink supply device having a plurality of ink supply containers respectively provided for the predetermined colors, a plurality of ink supply pumps that feed the ink from the respective ink supply containers, and the plurality of second pipes each having the other end connected to one of the plurality of ink supply pumps,
the first material includes an ink tank unit having a plurality of ink storage tanks for storing the ink of the respective colors supplied from the ink supply device, and the plurality of first pipes each having the other end connected to one of the plurality of ink storage tanks, and
the ink tank unit supplies the ink of the predetermined colors delivered from the respective ink storage tanks, to the ink jet head.

* * * * *